United States Patent
Bose et al.

(10) Patent No.: US 7,506,216 B2
(45) Date of Patent: Mar. 17, 2009

(54) SYSTEM AND METHOD OF WORKLOAD-DEPENDENT RELIABILITY PROJECTION AND MONITORING FOR MICROPROCESSOR CHIPS AND SYSTEMS

(75) Inventors: Pradip Bose, Yorktown Heights, NY (US); Jude A. Rivers, Cortlandt Manor, NY (US); Jayanth Srinivasan, Urbana, IL (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 10/829,741

(22) Filed: Apr. 21, 2004

(65) Prior Publication Data

US 2005/0257078 A1 Nov. 17, 2005

(51) Int. Cl.
  *G06F 11/00* (2006.01)
  *G06F 11/34* (2006.01)
(52) U.S. Cl. .............................. 714/47; 714/33; 703/14
(58) Field of Classification Search ............... 714/1–57; 703/13–16, 20, 21; 702/81, 182–186
See application file for complete search history.

(56) References Cited

U.S. PATENT DOCUMENTS

| | | | |
|---|---|---|---|
| 4,766,595 A * | 8/1988 | Gollomp .................... | 714/33 |
| 5,216,612 A * | 6/1993 | Cornett et al. ............... | 700/96 |
| 5,497,076 A | 3/1996 | Kuo et al. | |
| 5,847,966 A | 12/1998 | Uchino et al. | |
| 6,021,511 A * | 2/2000 | Nakano ...................... | 714/48 |
| 6,182,249 B1 * | 1/2001 | Wookey et al. .............. | 714/47 |
| 6,363,515 B1 | 3/2002 | Rajgopal et al. | |
| 6,532,570 B1 | 3/2003 | Mau | |
| 6,684,349 B2 * | 1/2004 | Gullo et al. ................... | 714/47 |
| 6,714,890 B2 * | 3/2004 | Dai ........................... | 702/132 |
| 6,845,456 B1 * | 1/2005 | Menezes et al. ............ | 713/320 |
| 6,892,317 B1 * | 5/2005 | Sampath et al. ................ | 714/4 |
| 6,895,533 B2 * | 5/2005 | Gray et al. ..................... | 714/47 |
| 6,934,673 B2 * | 8/2005 | Alvarez et al. ............... | 703/21 |
| 6,982,842 B2 * | 1/2006 | Jing et al. ..................... | 360/31 |
| 7,058,824 B2 * | 6/2006 | Plante et al. ................ | 713/300 |

(Continued)

OTHER PUBLICATIONS

Wikipedia's Mean Time Between Failures version from Apr. 18, 2004 http://en.wikipedia.org/w/index.php?title=Mean_time_between_failures&oldid=4492104.*

(Continued)

*Primary Examiner*—Scott T. Baderman
*Assistant Examiner*—Joseph Schell
(74) *Attorney, Agent, or Firm*—Keusey, Tutunjian & Bitetto, P.C.; Brian P. Verminski, Esq.

(57) ABSTRACT

A system and method for projecting reliability includes a module, such as a chip, which includes workload inputs, which account for activity on the chip. A reliability module interacts with the chip to determine a reliability measurement for the chip based upon the workload inputs such that functions of the chip are altered based upon the reliability measurement. The reliability measurements are employed to rate or improve chip designs or calculate a reliability measure in real-time.

25 Claims, 4 Drawing Sheets

U.S. PATENT DOCUMENTS

| | | | | |
|---|---|---|---|---|
| 7,107,491 | B2* | 9/2006 | Graichen et al. | 714/37 |
| 7,308,614 | B2* | 12/2007 | Kojori | 714/47 |
| 2002/0099521 | A1* | 7/2002 | Yang et al. | 702/186 |
| 2003/0074173 | A1* | 4/2003 | Monroe | 703/13 |
| 2003/0182084 | A1* | 9/2003 | Tanaka et al. | 702/184 |
| 2005/0217300 | A1* | 10/2005 | Cheng et al. | 62/259.2 |

OTHER PUBLICATIONS

M. Moudgill et al.; Environment for PowerPC Microarchitecture Exploration; MET/Turandot paper, IEEE Micro May-Jun. 999; pp. 15-25.

D. Brooks et al.; New Methodology for Early-Stage, Microarchitecture-Level Power=Performance Analysis of Microprocessors; IBM Jounal, R & E, vol. 47 No. 5/6 Sep./Dec. 2003; pp. 653-670.

K. Skadron et al.; Temperature-Aware Microarchitecture; Proceeding of the 30th Int'l Symp. on Computer Architecture, Jun. 9-11, 2003 San Diego, CA ; IEEE Piscataway NJ US; pp. 1-12.

J. Srinivasan et al.; RAMP: A Model for Reliability Aware Microprocessor Design; IBM Confidential Research Report, Sep. 2003; 1 page.

* cited by examiner

SYSTEM AND METHOD OF WORKLOAD-DEPENDENT RELIABILITY PROJECTION AND MONITORING FOR MICROPROCESSOR CHIPS AND SYSTEMS

BACKGROUND OF THE INVENTION

1. Field of the Invention

The present invention relates to pre-silicon and/or post silicon projection of reliability metrics pertaining to microprocessor chips and systems. More particularly, the present invention provides a reliability measure rating a design or for the performance of a chip.

2. Description of the Related Art

Advances in semiconductor (specifically, CMOS) technology have been improving microprocessor performance steadily over the past twenty years. However, such advances are of late accelerating the onset of reliability problems. Specifically, one of the consequences of progressive scaling of device and interconnect geometries is the increase in average and peak power densities (and hence temperatures) across the chip. The inherent increase in static (leakage) power with scaling into the deep submicron region, adds to this problem, and the fact that the major components of leakage power increase with temperature, makes the problem even harder to control.

Despite advances in packaging and cooling technologies, it is an established concern, that the average and peak operating temperatures within key units inside a microprocessor chip will be higher with the progressive scaling of technology. Already, to protect against thermal runaways, microprocessors (like Intel's Pentium 4™ and IBM's POWER5™) have introduced on-chip temperature monitoring devices, with mechanisms to throttle the processor execution speeds as needed. The objective is to reduce on-chip power when maximum allowable temperatures are approached or exceeded.

Failure rates of individual components making up an integrated circuit (or a larger system) are fundamentally related to operating temperatures: these rates increase with temperature. As such, chips or systems designed to operate at a given average temperature range, are expected to fail sooner than specified, if that range is routinely exceeded during normal operating conditions. Conversely, a chip or system is designed to meet a certain mean time to failure (MTTF), at an assumed maximum operating temperature. In this case, the designed chip or system will be expected to have a longer lifetime, if the actual operating temperatures happen to be lower.

Electromigration and stress migration effects in the chip interconnects are major sources of failures in a chip and, they both have a direct dependence on operating temperature. However, aspects of reliability degradation with CMOS scaling, are not solely due to the power and temperature implications. For example, time-dependent dielectric breakdown (TDDB) is an extremely important failure mechanism in semiconductor devices. With time, gate dielectric wears down and fails when a conductive path forms in the dielectric.

With CMOS scaling, the dielectric thickness is decreasing to the point where it is tens of angstroms only. This, coupled with the fact that there has been a general slowdown in the way the supply voltage is scaling down, is expected to increase the intrinsic failure rate due to dielectric breakdown. In addition, TDDB failure rates also have very strong temperature dependence. Thermal cycling effects, caused by periodic changes in the chip temperature is another factor that degrades reliability. This factor is not directly related to the average operating temperature; rather, it is a function of the number of thermal cycles that the chip can go through before failure.

SUMMARY OF THE INVENTION

A system and method for projecting reliability includes a chip or module, which includes workload inputs, which account for activity on the chip. A reliability module interacts with the chip to determine a reliability measurement for the chip based upon the workload inputs. The reliability measurements are employed to monitor the chip or as feedback for chip designing.

A method of projecting mean time to failure for a microprocessor running a given workload or mix of workloads, includes estimating instructions-per-cycle (IPC) and utilizing, at the microarchitectural unit level, through computer program based simulation, driven by an execution trace of the input workload or through statistical and analytical modeling, and optionally supplemented by a structured data flow analysis procedure applied to the input workload trace. The unit-level IPC values are converted into estimated power and power density values, using a piecewise linear approximation based formulation, calibrated through detailed, power simulation methodologies.

The power density map is converted, controlled by an input chip floorplan, into a unit-wise temperature profile, using either: (a) temperature models or (b) IPC-oriented, piecewise linear approximation-based models of temperature, calibrated through separate, direct measurement-based devices (e.g., sensors). The workload and time-dependent temperature data are converted into failure rate projections, leading to overall projections of mean time to failure (MTTF).

In other embodiments, a program execution trace is analyzed to estimate and bound the unit-wise IPC and utilization values of a target processor, with specified, high-level microarchitectural parameters, without explicit cycle-by-cycle or event-driven simulation. Power weights may be assigned to each high-level, pipelined, microarchitectural unit, obtained from unconstrained, circuit-analysis based analysis of the maximum power profile across the microprocessor chip.

A set of analytical equations, based on, e.g., pipeline flow theory, may be employed to convert unit-wise IPC or utilization values into corresponding power numbers, assuming, e.g., a finely clock-gated pipeline implementation of the processor microarchitecture. The obtained power numbers may be combined with early estimates of unit-level areas, to generate power densities observed across a given chip floorplan. The obtained unit-wise IPC and power density numbers are preferably converted into transient and steady-state temperature profiles that are calibrated using a one-time, direct measurement sensor.

The generated temperature profiles may be used as one of the inputs to a set of analytical equations, based on reliability theory, to convert the profiles into relative adjustments to the overall chip MTTF.

An IPC-based power, temperature and reliability estimation software module may be integrated into an existing, microarchitecture or register transfer (RT) level, workload-driven power-performance simulator. Alternately, an IPC or utilization-based, fast estimator of temperature and reliability in software may be integrated into an existing hypervisor or operating system (OS) level workload management layer of the overall computing system.

A counter-based, IPC-centric estimator of power, temperature and reliability, at the unit and chip-level may be part of the on-chip monitoring hardware designed to provide power-performance-reliability estimates in hardware or in software. This may include the ability to capture the manner in which the mean time to failure varies as a function of the input workload executing on the microprocessor or microprocessor-based system.

An aspect of the invention includes employing temperature-sensitive degradation of chip reliability factors, of workload-dependent variation of failure rates and mean time to failure. CMOS technology scaling and temperature-insensitive degradation of chip reliability factors, of workload and CMOS generation-dependent variation of failure rates and mean time to failure may also be employed.

The present invention may be implemented as a computer program module, that can be integrated into an existing microarchitecture or RT-level, cycle-accurate simulation model for detailed analysis of the transient and steady-state reliability of a given microprocessor chip, well before the actual fabrication and manufacturing of the chip. The software module may be integrated into an operating system or hypervisor layer, as part of the chip- and system-level workload management function of such software associated with the operation of a uni or multiprocessor system.

A method for designing a chip or module or a system of chips or modules based upon projected reliability, includes simulating a chip or module response based upon design information, estimating chip activity based upon a workload trace, converting the chip response and the chip activity to failure rate data, and analyzing a design of the chip based upon the failure rate data. The method may be implemented in software as part of an analysis package for chip designs.

A method for monitoring a chip or system of chips based upon projected reliability includes determining physical responses of a chip during operation. The responses include chip activity. The physical responses of the chip are converted to failure rate data by performing reliability evaluations based upon the physical responses. A reliability projection is determined based on the failure rate data.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention provides a workload-dependent variability of failure rates and overall mean time to failure (MTTF) which can be projected or estimated, during pre-silicon simulation/emulation or post-silicon field operation and measurement of an integrated circuit chip or an overall digital system. Microarchitecture and register transfer (RT) level power estimation methodologies or temperature estimation models may be provided by existing systems to portray power, power density or temperature profiles of the chip, for a given floorplan. Both transient and steady-state power and temperature profiles can also be generated. The present invention provides features and measurements to provide reliability metrics in a quantitative manner and is therefore able to estimate transient and average reliabilities for given input workloads.

The actual operating temperature and failure rate of a component (and hence of the system) depend on the workload. As such, the present invention provides systems and methods to estimate failure rates (and hence MTTF) of a component (and the whole system) as a function of the input workload or of real-time operational scenarios. Such methods are useful in both pre and post-silicon settings.

For example, during pre-silicon design, if workload-driven modeling at the microarchitecture-level or at the register-transfer level (RTL) includes reliability projections, then the designer could ensure targeted MTTF values, before the chip is certified for product-level manufacturing. In this way, the reliability estimation module may be implemented as a software component of a pre-silicon simulation model, as in the case of power estimation or temperature estimation; or, as a hardware/FPGA (field programmable gate array) component of a pre-silicon emulation model.

Similarly, in a post-silicon setting, temperature-sensitive reliability estimates could be continuously measured or monitored during normal operating conditions.

It should be understood that the elements shown in FIGS. may be implemented in various forms of hardware, software or combinations thereof. Preferably, these elements are implemented in a combination of hardware and software on one or more appropriately programmed general-purpose digital computers having a processor and memory and input/output interfaces. A module referred to herein may include a chip, system of chips or a computer rendered simulation of a chip. Module and chip may be employed synonymously herein. A module may further include a chip design, printed circuit board or a software module in the context of computer implementations.

Figure 1:
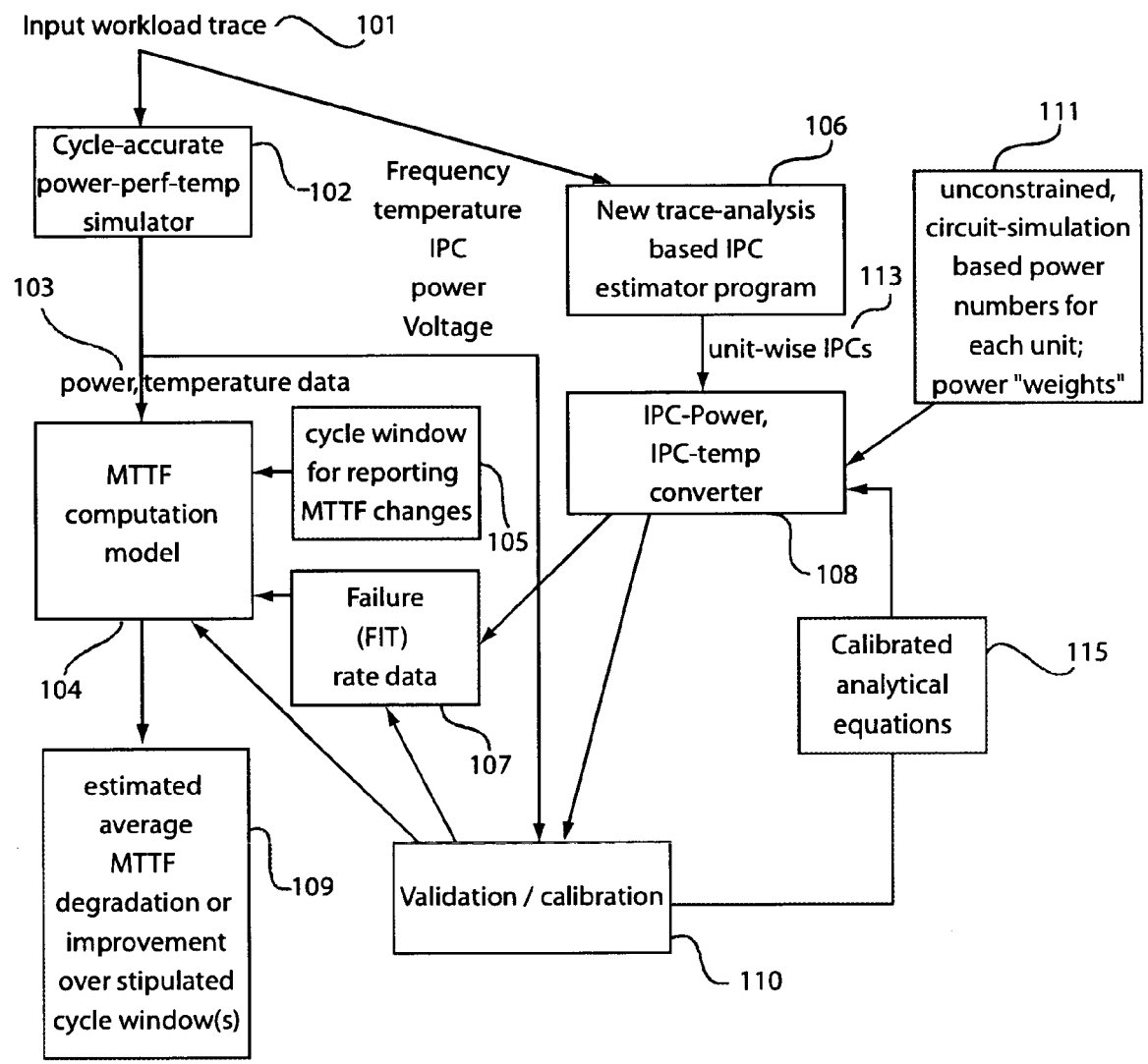
FIG. 1 is a block/flow diagram showing an illustrative example of a system/method for converting characteristics of a chip or chip design into failure data to improve a chip design in accordance with the present invention.

Referring now to the drawings in which like numerals represent the same or similar elements and initially to FIG. 1, a block/flow diagram illustratively shows an illustrative system/method 100 which includes the ability to capture the manner in which mean time to failure (MTTF) varies as a function of the input workload executing on a microprocessor or microprocessor-based system input as an input workload trace 101.

System 100 may be implemented as computer modules in an application software package, which may be employed for analyzing and designing chips or chip systems. A workload trace 101 provides information about the types and quantity of operations needed to be performed on a module or chip.

System/method 100 employs an input workload trace 101. Trace 101 may be generated by a number of commercially available computer aided design and analysis systems. The program execution trace 101 may be analyzed to estimate and bound, e.g., the unit-wise instruction per cycle (IPC) utilization values of a processor module, chip or chip design, with specified, high-level microarchitectural parameters, without explicit cycle-by-cycle or event-driven simulation, as will be described in greater detail below.

The present invention may be tailored to work with a plurality of different input traces. In one example, trace 101 may include information about quantity of tasks or work that a particular chip, chip design or module is being designed to accomplish. Trace 101 may include worst case, best case or time dependent workloads, which are input to a performance simulator 102.

Performance simulators 102 may include conventional simulation applications to perform cycle-accurate power performance and temperature simulations of a given chip design. After simulating the design of a chip or system of chips, simulator 102 outputs data 103, such as for example, power and temperature data about the design.

Simulator 102 may include a plurality of energy models or other models, which can determine physical responses for a given design. For example, this may include data 103 for a given chip floorplan (geometry), thermal responses or temperature profiles, resistive, capacitive, inductive, frequency (RF) and power information or responses which may be employed in creating a mean time to failure (MTTF) computation model 104. Data 103 may also include transient or steady state responses for at least the physical quantities described above and other physical characteristics.

A trace analysis is performed by an estimator 106 to determine chip activity per unit or chip. One illustrative way to perform this estimation is to employ an instruction per cycle (IPC) analysis to determine (IPC) analysis, although other techniques may be employed. For example, an analysis based on a number of accesses for memory chips, unit counters or amount of data transmitted, etc. may be performed in addition or instead of the IPC analysis.

The IPC analysis may be performed by employing an estimator program using data provided in trace 101 (e.g., geometry, electrical characteristics, and other physical characteristics). IPC's may be allocated per unit (e.g., unit-wise IPC's 113) to permit a converter 108 to associate temperature and/or power loads or dissipation with each instruction or activity occurring on a chip or system. Units may include portions of a chip, circuits, memory cells, functional units or partitions of a system or chip. For example, units for processing may include hardware related to an instruction fetch unit (IFU), instruction decode unit (IDU), instruction scheduling unit (ISU), fixed point unit (FXU), branch prediction unit (BPU), load/store unit and/or floating point unit (FPU). Other units or sub-divisions of units are also contemplated.

IPC's are estimated or bound such that the unit-wise IPC values are extrapolated via analytical equations 115 into transient and steady-state power, temperature and failure rate variations over specified processor cycle windows. Such analysis may employ circuit simulation based power numbers (e.g., power generation) for each unit. These power numbers may include power weights, which provide a relative power consumption or dissipation quantity with respect to time or space for each unit.

Converter 108 employs input from simulator 102 and estimator 106 to validate or calibrate analytical equations 115 for handling the conversion of IPC information to power and temperature influences across a chip or system design. This may include converting the unit-level IPC values into estimated power and power density values, using a piecewise linear approximation based formulation, calibrated through power simulation methodologies. This may be performed using a validation/calibration module 110.

Individual failure models are employed to provide input to the conversion of chip activity to reliability estimates. A power density map, controlled by an input chip floorplan, may be converted by converter 108 into a unit-wise temperature profile, using either: (a) temperature or other models or (b) IPC-oriented, piecewise linear approximation based models of temperature, power etc.

Workload and time-dependent temperature data are converted into failure rate projections 107, leading to overall projections of mean time to failure (MTTF) 109.

The individual failure models are employed in the reliability evaluation methods of the present invention. These models provide failure rates 107 and MTTF estimates 105 based on instantaneous operating conditions such as, for example, temperature and IPC. These instantaneous failure rates 107 are calculated for discrete structures on-chip, for example, caches and functional units. Then, the structure level failure estimates are combined to provide chip-wide failure rates 109. These and other factors are employed to create a reliability model 104 (128 (FIG. 2)) which accounts for time based variations in application behavior, providing application specific, temporal and spatial reliability information in advance of chip manufacture and/or during operation of the chip.

The reliability model determines, e.g., MTTF, which is employed to rate a chip design or provide feedback for the chip operation.

Figure 2:
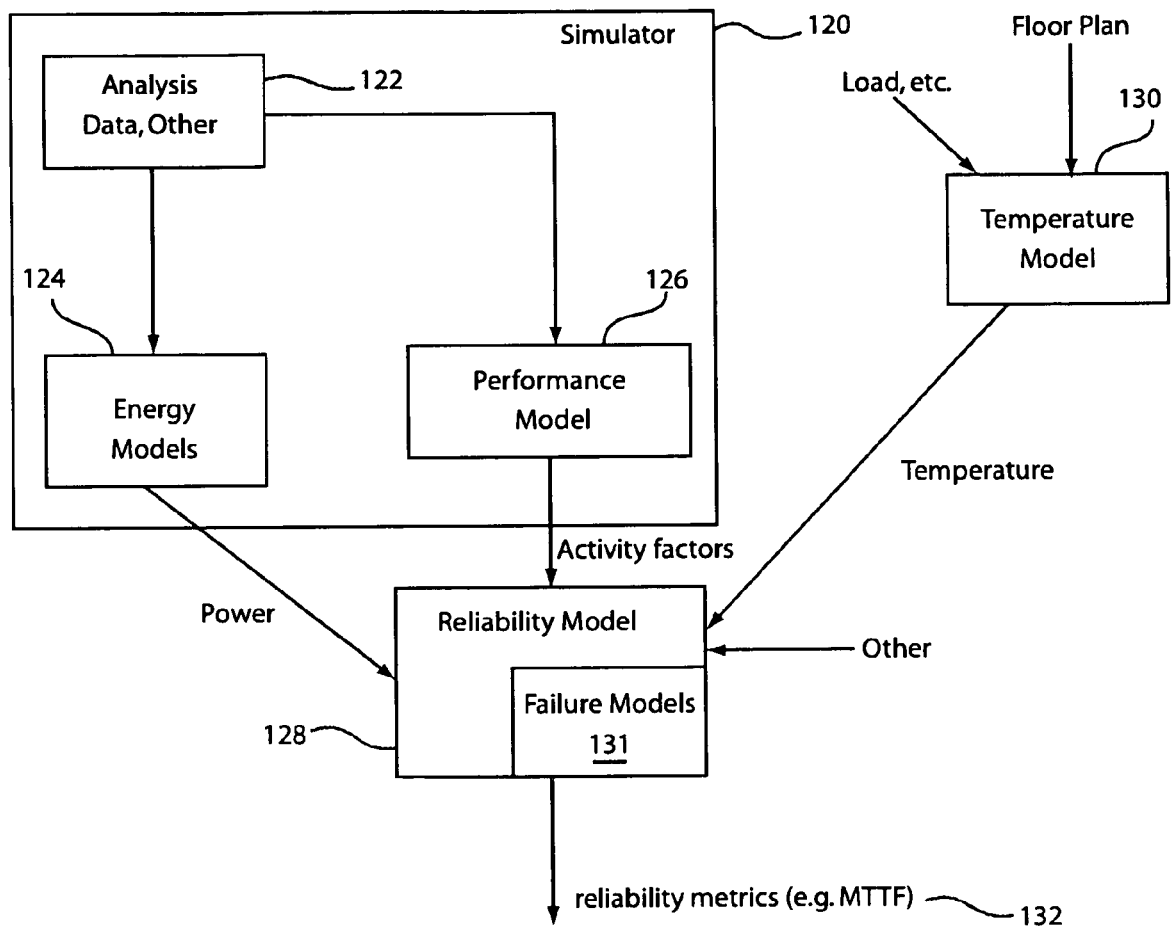
FIG. 2 is a block/flow diagram for schematically depicting the development of a reliability model, preferably in a computer simulation regime in accordance with an embodiment of the present invention.

Referring to FIGS. 1 and 2, a plurality of models 124, 126, 130 are employed to provide input to a reliability model 128, which is illustratively depicted in FIG. 2. The reliability model 128 or MTTF computation model 104 includes a plurality of failure models 131, which address a plurality of individual failure mechanisms to determine a chip-wide MTTF or MTTF for a particular component or bottle-neck feature of a chip or system of chips.

Some of these failure models 131 will be illustratively described below. These models are for illustrative purposes; other models may also be employed. These failure models provide failure estimates based on instantaneous operating conditions like processor temperature, IPC, and voltage. These models may express reliability in terms of MTTF (mean time to failure or expected life time of the processor).

Electromigration occurs in aluminum and copper interconnects due to the mass transport of conductor metal atoms in the interconnects. Conducting electrons transfer some of their momentum to the metal atoms of the interconnect. This "electron wind" driving force creates a net flow of metal atoms in the direction of electron flow. As the atoms migrate, there is depletion of metal atoms in one region and pile up in other regions. The depletion sites can see increased interconnect resistance or open circuits, and extrusions can occur at sites of metal atom pile up. Electromigration has an exponential dependence on temperature.

Extensive research has been performed by the material science and semiconductor community on modeling the effects of electromigration, and it is a well understood failure mechanism.

A model used for electromigration includes:

$$MTTF = A \frac{CV}{WH} fp e^{\frac{E_a}{kT}}$$

where A is a proportionality constant, C is the capacitance of the structure, V is the supply voltage, W is the width of interconnects modeled, H is the height of interconnects modeled, f is the operating frequency, p is the activity factor of utilization of the structure, $E_a$ is the activation energy for electromigration, k is Boltzmann's constant, and t is the temperature in Kelvin of the structure.

Much like electromigration, stress migration is a phenomenon where the metal atoms in the interconnects migrate. It is caused by mechanical stress due to differing thermal expansion rates of different materials in a device. A model used for stress migration includes:

$$MTTF = A|T - T_0|^{-n} e^{\frac{E_a}{kT}}$$

where A is a proportionality constant, T is the temperature of the structure, $T_0$ is the stress free temperature or metal deposition temperature, $E_a$ is the activation energy for stress migration, and k is Boltzmann's constant.

Time-dependent dielectric breakdown (TDDB), or gate oxide breakdown, is another failure mechanism in semiconductor devices. The gate dielectric wears down with time, and fails when a conductive path forms in the dielectric. The model used for TDDB includes:

$$MTTF = A\left(\frac{1}{V}\right)^{(a-bT)} e^{\left(\frac{X+\frac{Y}{T}+ZT}{kT}\right)}$$

where A is a proportionality constant, V is the supply voltage, T is the temperature of the structure, and a, b, X, Y, and Z are fitting parameters.

Temperature cycles can cause fatigue failures. Damage accumulates every time there is a cycle in temperature, eventually leading to failure. Although all parts of the device experience fatigue, the effect is most pronounced in the package and die interface (for example, solder joints). The model used for thermal cycling includes:

$$MTTF = A\left(\frac{1}{T - T_{ambient}}\right)^q$$

where A is a proportionality constant, T is the temperature of the structure, $T_{ambient}$ is the ambient temperature, and q is a structure dependent exponent.

To obtain the overall reliability of a processor, the effects of different failure mechanisms are combined across different structures. This includes knowledge of lifetime distributions of the failure mechanisms, and is generally difficult. One model used in the industry is the sum-of-failure-rates (SOFR) model, which makes two assumptions to address this problem: (1) the processor is a series failure system, in other words, the first instance of any structure failing due to any failure mechanism causes the entire processor to fail; and (2) each individual failure mechanism has a constant failure rate (equivalently, every failure mechanism has an exponential lifetime distribution).

The above two assumptions imply (1) the MTTF of the processor, $MTTF_p$, is the inverse of the total failure rate of the processor, $\lambda_p$; and (2) the failure rate of the processor is the sum of the failure rates of the individual structures due to individual failure mechanisms. Hence, $$MTTF_p = \frac{1}{\lambda_p} = \frac{1}{\sum_{i=1}^{j} \sum_{l=1}^{k} \lambda_{il}}$$

where $\lambda_{i1}$ is the failure rate of the ith structure due to the lth failure mechanism.

The individual failure mechanism models provide failure rates for fixed instantaneous operating conditions. However, when an application runs, these parameters all vary with time. This variation may be accounted for by: (1) calculating a failure rate based on instantaneous parameters; and (2) using an average over time of these values to determine the actual failure rate for each structure for each failure mechanism when running the application.

Using this mechanism for simulation, the reliability mechanism or model can be used in architectural simulators for early design stage reliability evaluation. For example, IPC, power and temperature values obtained for a simulator 120 (and/or 102, 106 in FIG. 1) can be used in the individual model equations to obtain instantaneous failure rates for different structures on chip. These instantaneous failure rates can then be combined spatially and temporally using the mechanisms described above to provide reliability simulations for the entire processor. This will provide reliability data for individual applications and across different workloads.

Figure 3:
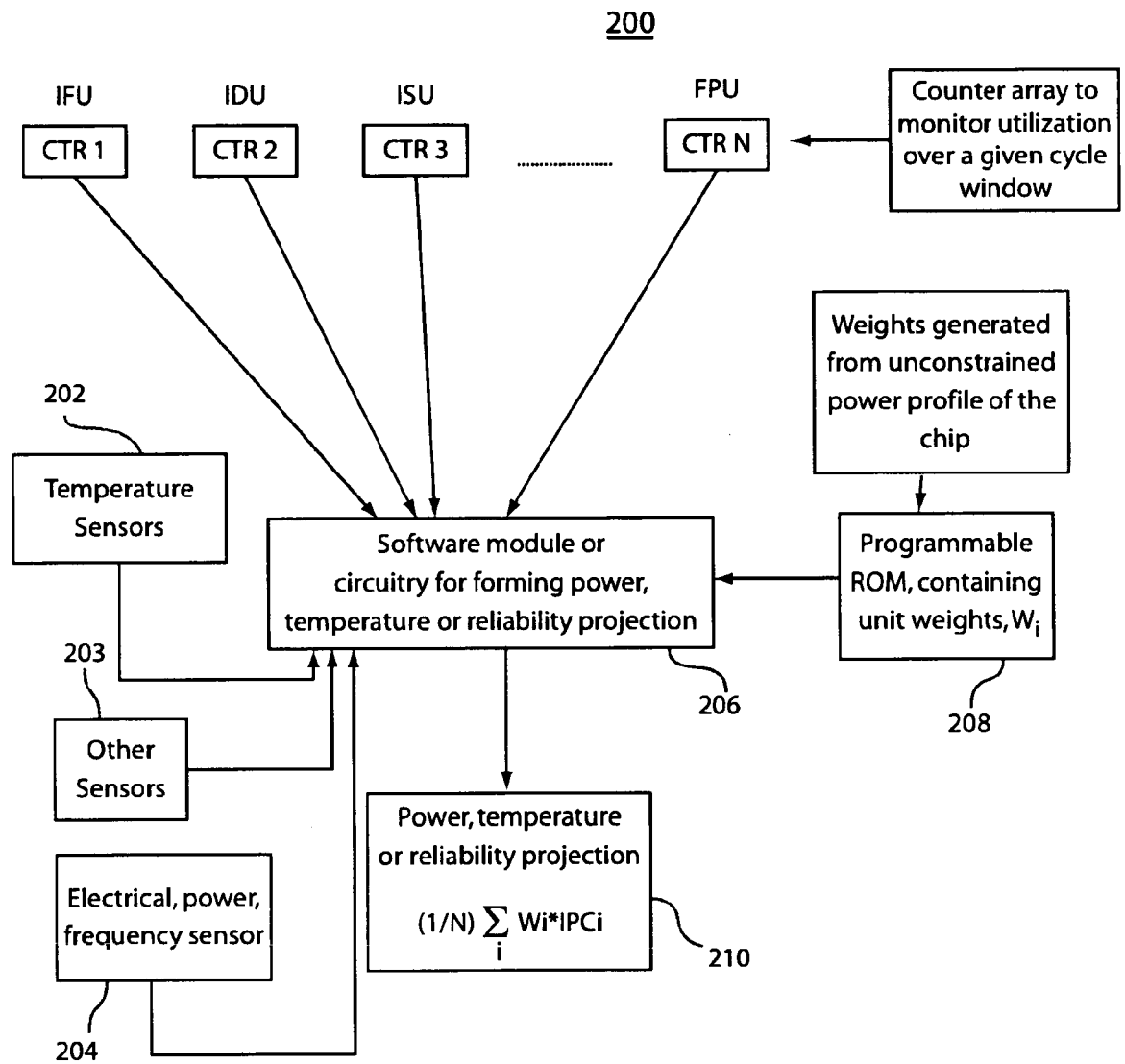
FIG. 3 is a block/flow diagram depicting the development of a reliability model, preferably in the setting of on-chip hardware-based projection and monitoring in accordance with an embodiment of the present invention.

In FIG. 3, simulator 120 receives data 122 (design data or measured data from a running chip) and determines power and activity characteristics or values based on energy models 124 and performance models 126. Based on a chip floorplan and loading information, a temperature model outputs temperature information. This and other information (power, activity, etc.) is input into a reliability model 128 to calculate the effects of, e.g., power, activity, frequency, energy, temperature, etc. on reliability by employing the reliability models 131 as explained above.

The failure models determine reliability based on the provided conditions and, in one embodiment, the model outputs are combined to get an overall reliability metric 132 (e.g., MTTF). Metric 132 is then employed to alter the processes of the chip or device to ensure long life, reduce the possibility of failure, optimize operations, etc. Measurements may be taken at predetermined intervals or cycle windows such that the computation does not require much overhead to perform.

Referring to FIG. 3, a system 200 may be implemented in hardware or software. In one embodiment illustratively shown in FIG. 3, on-chip activity is measured by employing functional unit counters CTR 1-N, temperature sensors 202, electrical sensors 204 or other sensors 203. With these inputs, on-line real-time reliability calculations can be performed. The temperature, power, activity, etc. factors obtained from the counters CTR and sensors 202, 203, and 204 can be utilized by on-chip reliability evaluation hardware or circuitry 206 in the equations for individual failure mechanisms.

In an alternate embodiment, a mechanism 206 may be used as part of an operating system. Instead of having on-chip reliability calculation hardware, the readings from temperature sensors 202, sensors 203, electrical sensors 204 and activity counters CTR may be collated by an operating system where a kernel program can calculate processor reliability and output a projection or metric.

Unit weights, $W_i$, may be stored on-chip or off-chip in memory 208, e.g., programmable read-only memory and employed to assist in the calculation of reliability projections.

FIG. 3 shows counter-based on-chip hardware monitoring circuitry 206 for estimating dynamic power, and related temperature-sensitive reliability metrics. Alternately, software module 206 may employed as, e.g., an operating system or hypervisor-level workload manager specific software tool that monitors specific events and counters on the processor chip, to estimate variations in chip and system-level reliability metrics, as a function of workload mix and time.

The present invention provides reliability feedback, based on fundamental formulations in the physics of CMOS technology scaling and temperature-insensitive degradation of chip reliability factors, of workload and CMOS generation-dependent variation of failure rates and mean time to failure, to control chip or system performance.

Computer program module 206 can be integrated into an existing microarchitecture or RT-level, cycle-accurate simulation models for detailed analysis of the transient and steady-state reliability of a given microprocessor chip, well before the actual fabrication and manufacturing of the chip or during the operation of the chip. Software module 206 can also be integrated into an operating system or hypervisor layer, as part of the chip and system-level workload management function of such software associated with the operation of a uni or multiprocessor system.

A systematic methodology for obtaining relative changes in mean time to failure (MTTF) expectations (with respect to initial qualified "specs") while running a given workload or mix of workloads, is provided.

The present invention may be employed as a workload-driven power-performance simulator, to enable early stage performance-power-reliability tradeoff studies, and provide a fast, early-stage, workload-driven software analysis tool for estimating or bounding instructions-per-cycle (IPC), wherein the unit-wise IPC values are extrapolated via analytical equations into transient and steady-state power, temperature and failure rate variations over specified processor cycle windows. A counter-based on-chip hardware monitoring circuitry may alternately be provide for estimating dynamic power, and related temperature-sensitive reliability metrics and/or an operating system or hypervisor-level workload manager specific software tool that monitors specific events and counters on the processor chip, to estimate variations in chip and system-level reliability metrics, as a function of workload mix and time.

Figure 4:
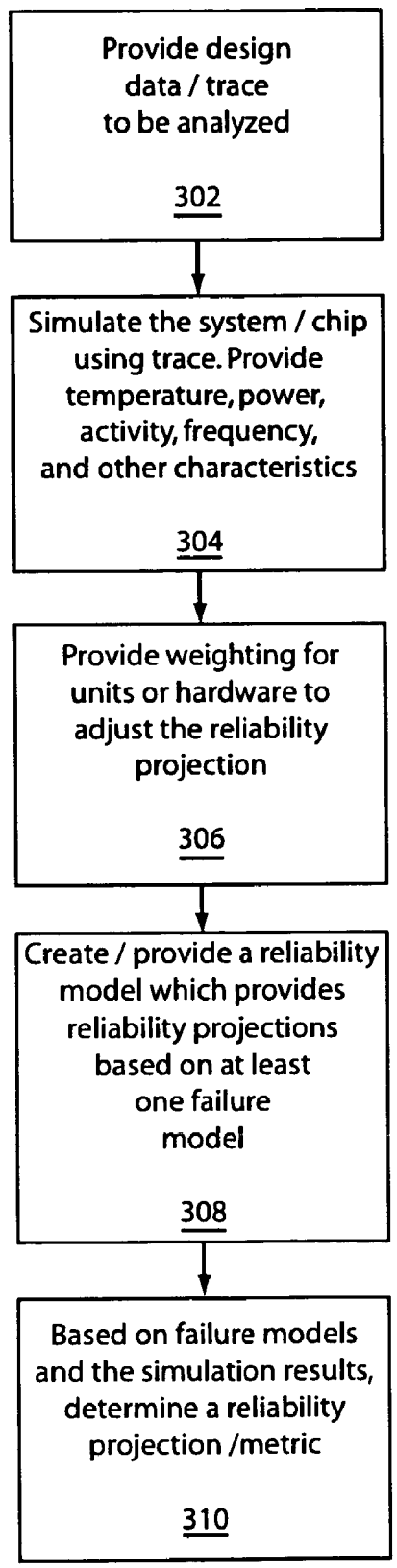
FIG. 4 is a block/flow diagram showing steps for monitoring chip operations in accordance with a reliability projection in accordance with an embodiment of the present invention.

Referring to FIG. 4, a block/flow diagram depicts a method of operation in accordance with one illustrative embodiment of the present invention. FIG. 4 is general and applies to both the design phase and the post manufacture stage chips or systems, although all of the steps are not applicable to both scenarios. In block 302, a program execution trace is provided for a chip or system design. The trace is to be analyzed, for example, to estimate and bound the unit-wise IPC and utilization values of a processor, with specified, microarchitectural parameters, without explicit cycle-by-cycle or event-driven simulation.

In block 304, the simulation is performed to generate activity, power, temperature, frequency and any other characteristics of a design. This is preferably performed by employing one or more simulators for estimating instructions-per-cycle (IPC) and utilization at the microarchitectural unit level, preferably through computer program based simulation, driven by an execution trace of the input workload or through statistical and analytical modeling. This data may be optionally supplemented by a structured data flow analysis procedure applied to the input workload trace.

In block 306, power "weights" may be assigned to each high-level, pipelined, microarchitectural unit or structure, obtained from unconstrained, circuit-analysis based analysis of a power, temperature, etc. profile across the microprocessor chip.

In block 308, a reliability model is created by converting characteristic quantities into reliability terms. In one example, by converting the unit-level IPC values into estimated power and power density values, using, e.g., a piecewise linear approximation based formulation, a density map may be calibrated through power simulation methodologies. In addition, the power density map, controlled by an input chip floorplan, may be converted into a unit-wise temperature profile, using, e.g., temperature models or IPC or counter oriented (workload), piecewise linear approximation based models of temperature, calibrated through separate, direct measurement-based devices (e.g., sensors). In other words, all chip parameters are mapped, based on failure calculations, to a chip floorplan. For example, workload and time-dependent temperature data are preferably converted into failure rate projections, leading to overall projections of mean time to failure (MTTF), as described below.

A set of analytical equations (e.g., based on pipeline flow theory) convert unit-wise IPC or utilization values into corresponding power numbers. This may be based on assumption or actual measurements. An example of an assumption that may be useful includes assuming a finely clock-gated pipeline implementation of the processor microarchitecture. The obtained power numbers are combined with early estimates of unit-level areas, to generate power densities observed across a given chip floorplan.

The obtained unit-wise IPC and power density numbers may be converted into transient and steady-state temperature profiles, that are calibrated using, for example, a direct measurement apparatus (sensor) or may be based on simulation results. The generated temperature profiles are used as one of the inputs to a set of analytical equations, based on reliability theory, to convert the profiles into relative adjustments to the overall chip projection/metric (e.g., MTTF).

In block 310, based on the failure rate projections and simulation conversions (profiles), a reliability projection metric is calculated. The reliability projection/metric may be determined by on-chip hardware or in software in an operating system or a combination thereof. For example, a counter-based, IPC-centric estimator of power, temperature and reliability, at the unit and chip level may be employed as part of the on-chip monitoring hardware designed to provide power-performance-reliability measures by employing hardware or software implementations. Alternately, a power, temperature and reliability estimation software module may be employed that can be integrated into an existing, microarchitecture or RT-level, workload-driven power-performance simulator. In still other embodiments, an IPC or utilization-based, fast estimator of temperature and reliability in software may be integrated into an existing hypervisor or OS-level workload management layer of the overall computing system.

Having described preferred embodiments of a system and method of workload-dependent reliability projection and monitoring for microprocessor chips and systems (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A system for projecting reliability of an integrated circuit chip, comprising:
   a first module of the integrated circuit chip including workload inputs which account for operating activity on the first module, the workload inputs including one of an estimated workload and a measured workload for the first module;
   a second module of the integrated chip configured to convert the workload inputs into at least one of temperature influences and power influences across the integrated chip; and
   a reliability module, integrated on the chip, interacting with the first module and the second module to determine a reliability measurement including a mean time to failure for the first module in real-time based upon the workload inputs and a measured operational quantity of the first module and based upon at least one of temperature influences and power influences of the second module.

2. The system as recited in claim 1, wherein the activity of the first module includes measurement of activity of hardware on the first module.

3. The system as recited in claim 2, wherein the measurement of activity on the first module is determined by an instruction per cycle analysis.

4. The system as recited in claim 2, wherein the measurement of activity on the first module is determined by counts on counters provided on the module.

5. The system as recited in claim 2, wherein the activity of the first module includes temperature, power, and frequency measurements.

6. The system as recited in claim 2, wherein the activity of the first module includes energy estimates.

7. The system as recited in claim 1, wherein the reliability module is integrated in the first module.

8. The system as recited in claim 7, wherein the system further includes an operating system for monitoring the workload and the reliability module includes a software module that permits the reliability measurement to be determined off-module from the first module.

9. The system as recited in claim 1, wherein the reliability measurement includes a mean time to failure value for the first module in its entirety.

10. A method for designing a module or system of modules based upon projected reliability, comprising the steps of:
    simulating a module response based upon design information;
    estimating module activity based upon a workload trace;
    converting the module response and the module activity to failure rate data using a plurality of reliability failure models which address a plurality of individual failure mechanisms by converting workload into at least one of temperature influences and power influences across the module; and
    analyzing a design of the module based upon the failure rate data to estimate mean times to failure for discrete components of the module, where the mean times to failure are employed to rate a module design or provide feedback for module operation to optimize design features of the module based upon the failure rate data.

11. The method as recited in claim 10, wherein the step of simulating a module response includes simulating power, temperature, frequency and performance of the module.

12. The method as recited in claim 10, wherein the step of estimating module activity based upon a workload trace includes estimating module activity by employing an instruction per cycle analysis.

13. The method as recited in claim 10, wherein the step of converting the module response and the module activity to failure rate data includes calculating failure rate data based upon the plurality of failure mechanisms using data obtained from the module response and the module activity.

14. The method as recited in claim 10, wherein the step of analyzing includes estimating a module-wide mean time to failure.

15. A program storage device readable by a machine, tangibly embodying a program of instructions executable by the machine to perform method steps for designing a module or system of modules based upon projected reliability, as recited in claim 10.

16. A method for monitoring a module or system of modules based upon projected reliability, comprising the steps of:
    determining physical responses of a module during operation, the responses including module activity and workload;
    converting the physical responses of the module to failure rate data by converting workload into at least one of temperature influences and power influences across the module and by performing reliability evaluations based upon the physical responses using a plurality of reliability failure models which address a plurality of individual failure mechanisms;
    determining a reliability projection based on the failure rate data to estimate mean times to failure for discrete components of the module, where the mean times to failure are employed to rate a module design or provide feedback for module operation; and
    adjusting module activity based upon the reliability projection.

17. The method as recited in claim 16, wherein the step of determining physical responses of a module during operation includes determining one or more of power, temperature, frequency and performance of the module.

18. The method as recited in claim 16, wherein the step of converting the physical responses of the module to failure rate data includes calculating failure rate data based upon the plurality of failure mechanisms using data obtained from the physical responses and module activity.

19. The method as recited in claim 16, wherein the module activity is determined by estimating module activity using an instruction per cycle analysis.

20. The method as recited in claim 16, wherein the module activity is measured by providing counter devices to measure module activity.

21. The method as recited in claim 16, wherein the step of determining a reliability projection based on the failure rate data includes estimating a module-wide mean time to failure.

22. The method as recited in claim 16, wherein the step of converting the physical responses of the module to failure rate data by performing reliability evaluations based upon the physical responses includes weighting physical responses in accordance with hardware features of the module.

23. The method as recited in claim 16, wherein the step of determining physical responses of a module includes providing sensors on the module to make measurements.

24. The method as recited in claim 16, wherein the step of converting the physical responses of the module to failure rate data includes providing a reliability module on-module to perform the step of converting.

25. The method as recited in claim 16, wherein the step of converting the physical responses of the module to failure rate data includes providing a software executable reliability module off-module to perform the step of converting.

* * * * *